United States Patent
Bourdev et al.

(10) Patent No.: US 7,339,597 B1
(45) Date of Patent: Mar. 4, 2008

(54) CREATING AND MANIPULATING RELATED VECTOR OBJECTS IN AN IMAGE

(75) Inventors: Lubomir D. Bourdev, San Jose, CA (US); Martin E. Newell, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 722 days.

(21) Appl. No.: 10/177,374

(22) Filed: Jun. 21, 2002

(51) Int. Cl.
*G09G 5/00* (2006.01)

(52) U.S. Cl. .................... 345/619; 345/652; 345/663; 345/678; 345/681

(58) Field of Classification Search ................ 345/581, 345/619, 650–652, 677, 678, 418, 473–474, 345/681, 663
See application file for complete search history.

(56) References Cited

U.S. PATENT DOCUMENTS

| | | | |
|---|---|---|---|
| 5,437,008 A | | 7/1995 | Gay et al. |
| 5,500,925 A | * | 3/1996 | Tolson .................. 345/581 |
| 5,577,189 A | | 11/1996 | Gay et al. |
| 5,592,599 A | | 1/1997 | Lindholm |
| 6,016,147 A | * | 1/2000 | Gantt .................. 345/420 |
| 6,057,854 A | | 5/2000 | Davis et al. |
| 6,208,355 B1 | | 3/2001 | Schuster |
| 6,226,000 B1 | | 5/2001 | Richens et al. |
| 6,476,934 B1 | | 11/2002 | Ilbery et al. |

(Continued)

FOREIGN PATENT DOCUMENTS

CA    2306652    10/2000

OTHER PUBLICATIONS

Aldus Intellidraw Reference Guide, Version 2.0 for Use with Apple Macintosh and Microsoft Window Computers, 1993, ISBN 1-56026-255-9 (Macintosh); ISBN 1-56026-256-7(Windows).

(Continued)

*Primary Examiner*—Kee M. Tung
*Assistant Examiner*—Hau H Nguyen
(74) *Attorney, Agent, or Firm*—Fish & Richardson P.C.

(57) ABSTRACT

Computer programs and computer-implemented methods implement techniques for creating and manipulating related vector objects in an image. These include creating a first vector object or elements in an image, creating a second vector object or elements in the image, and in response to creating the second vector object(s) in the image, calculating one or more new values for a first attribute of the one or more attributes for the first vector object(s) based at least in part on one or more of the current attribute values for the second vector object(s).

Relationships are defined between vector objects using equations that define a value (or values) for an attribute for one vector object or elements as a function of attribute value(s) defined for the same or different vector objects in the image. In preferred embodiments, the function includes equations defining an attractive force and a repulsive force between the attribute value(s).

27 Claims, 9 Drawing Sheets

U.S. PATENT DOCUMENTS

| | | |
|---|---|---|
| 6,271,861 B1 | 8/2001 | Sargent et al. |
| 6,300,955 B1 | 10/2001 | Zamir |
| 6,310,622 B1 | 10/2001 | Asente |
| 6,313,840 B1 | 11/2001 | Bilodeau et al. |
| 6,337,925 B1 | 1/2002 | Cohen et al. |
| 6,348,924 B1 * | 2/2002 | Brinsmead ................. 345/441 |
| 6,373,490 B1 | 4/2002 | Bendiksen et al. |
| 6,459,439 B1 | 10/2002 | Ahlquist et al. |
| 6,549,212 B1 | 4/2003 | Janzen |
| 6,628,295 B2 | 9/2003 | Wilensky |
| 6,633,300 B1 | 10/2003 | Tomack et al. |
| 6,769,982 B1 * | 8/2004 | Brosnan ....................... 463/16 |
| 6,774,907 B1 | 8/2004 | Gupta |
| 6,784,896 B1 | 8/2004 | Perani et al. |
| 6,795,069 B2 | 9/2004 | Raskar et al. |
| 7,123,269 B1 | 10/2006 | Bourdev et al. |
| 2002/0130908 A1 | 9/2002 | Wilensky |
| 2003/0112454 A1 | 6/2003 | Woolfe et al. |

OTHER PUBLICATIONS

Alias|Wavefront, Inc., "Learning Maya 4," Alias|Wavefront, a division of Silicon Graphics Limited, ISBN 0-9685725-5-3, pp. 5-22, 73-84, 289-306, 431-456, © 2001.

Foley, et al., "Computer Graphics: Principles and Practice, Second Edition in C," 1996, pp. 736-737.

Hsu et al., "Skeletal Strokes", Proceeding of the ACM Siggraph & Sigchi Symposium on User Interface Software & Technology, Nov. 1993, pp. 197-206.

Image Hose Creation Tutorial, pp. 1-9, http://www.dragoncrafted.com/tutorial/imagehose.htm.

Jay Arraich's Photoshop Tips-6.0 Brushes, pp. 1-5, http://www.arraich.com/ref/aabrushes.htm.

"*Maya Hardware Shader White Paper*," Alias/Wavefront, Toronto, Canada, Sep. 2001, pp. 1-22.

* cited by examiner

CREATING AND MANIPULATING RELATED VECTOR OBJECTS IN AN IMAGE

BACKGROUND

This invention relates to computer-implemented methods for processing electronic images and computer program products implementing such methods.

In conventional computer graphics or illustration programs, such as Adobe Illustrator, available from Adobe Systems Incorporated of San Jose, Calif., an image can include multiple graphical elements representing, e.g., shapes, objects or other components of the image. In general, vector illustration programs create and manipulate graphics in which such graphical elements are represented as vector objects that have attributes that define the visual characteristics of the corresponding graphical element in the image, such as location, color, size, shape, orientation, transparency, and the like, based on a set of attribute values that specify the amount of the corresponding attributes. Vector objects describe graphics mathematically, using, e.g., lines and curves that define their geometric characteristics. For example, a bicycle tire in a vector graphic is made up of a mathematical definition of a circle drawn with a certain radius, set at a specific location, and filled with a specific color. Vector objects can be edited—e.g., the location, size, or color can be changed—by changing attribute values associated with the object.

By contrast, many painting and image-editing programs, such as Adobe Photoshop, generate and manipulate bitmap or raster images. Raster images use a grid of pixels to represent graphics, with each pixel having a specific location and color value. A bicycle tire in a bitmap image is made up of a collection of pixels, with each pixel forming part of a mosaic that gives the appearance of a tire. A raster image is edited by editing pixels (i.e., by changing color or opacity values associated with a pixel), rather than objects or shapes.

While different vector objects in an image may share common attributes—for example, vector objects instantiated from a common class or template—conventional illustration programs typically treat each vector object instance as an independent entity and do not provide for relationships to be defined between vector objects when added to an image. Thus, to change the appearance of one or more vector objects, a user typically must select the desired vector objects after they have been added to an image and adjust the value of the particular attribute or attributes in question for the selected vector objects—for example, by manually performing some appropriate operation in a graphical user interface (which may include entering a new attribute value directly or manipulating appropriate graphical illustration tools to effect the desired change).

Some illustration programs provide for the creation of relationships between vector objects in an image. In some illustration programs, users can "group" unrelated objects into groups—for example, by selecting two or more vector objects in the image and invoking a "Group" command to relate the selected vector objects as a group. Typically, the grouped vector objects are thereafter treated as a single object (at least until an "Ungroup" command is invoked), such that a change to one part of the group is equally applied to the entire group. Similarly, some illustration programs provide for the creation of "links" between vector objects, such that one or more attributes of the linked elements are tied together—for example, by providing that size attributes of linked vector objects will have equal values, such that a change in the size attribute of one vector object will be applied to the other so that the sizes remain equal. Relationships can also be defined between vector objects in some conventional illustration programs through the use of an auto align command or tool, which can allow a user to quickly and easily align vector objects in an image (i.e., specific alignment relationships can be defined between selected vector objects). The auto align tool can also work while drawing new vector objects—for example, with the auto align tool selected, alignment feedback can be provided to a user when placing the new vector object in the image.

SUMMARY

The invention provides methods and apparatus, including computer program apparatus for creating and manipulating related vector objects in an image. Relationships can be defined between vector objects when the vector objects are created by associating the vector objects and using equations that define a value (or values) for an attribute for one vector object or elements in the image as a function of other attribute value(s) defined for the same or different vector objects in the image.

In general, in one aspect, the invention features computer-implemented methods and apparatus, including computer program apparatus, implementing techniques for processing one or more related vector objects representing one or more graphical elements in an image. The vector objects have one or more current values for one or more attributes which define one or more visual characteristics of the vector objects. A first vector object is created in the image. A second vector object is then created in the image. In response to the creation of the second vector object in the image, one or more new values are calculated for a first output attribute of the one or more attributes for the first vector object based at least in part on one or more of the current values of an input attribute for the second vector object.

Particular implementations can include one or more of the following features. New values for the first output attribute for the first vector object can be calculated based at least in part on one or more reference values. The reference values can include a base value of the first output attribute defined for the first vector object. New values for the first output attribute can be calculated for the first vector object based at least in part on the base value of the first output attribute for the first vector object and one or more of the current values of an input attribute for the second vector object. The base value of the first output attribute can derive from an initial value of the first output attribute defined when the first vector object was created in the image. The reference values can include one or more reference location values representing locations in the image. New values for the first output attribute for the first vector object can be calculated based at least in part on a distance between a location of the first vector object in the image and one or more of the locations represented by the reference location values in the image. The reference location values can define a shape in the image.

Creating the first vector object in the image can include creating a plurality of first vector objects in the image. Each of the first vector objects can have one or more current values for the one or more attributes defining one or more visual characteristics of the respective vector object. New values for the first output attribute for a plurality of the first vector objects can be calculated based at least in part on one or more of the current values of an input attribute of the one or more attributes for the second vector object. The input attribute and the output attribute can be the same or different. The attributes for the first vector object can include the first output attribute and a second output attribute, and new values for the second attribute can be calculated based at least in part on one or more current values of the input attribute of the one or more attributes for the second object.

In response to the creation of the second vector object in the image, new values for the first output attribute for the second vector object can be calculated based at least in part on one or more of the current values of the input attribute for the first vector object. A representation of the image can be displayed, with the first vector object being displayed with visual characteristics defined at least in part by the calculated new values for the first output attribute. The one or more attributes can include a location of the respective vector object in the image. The first output attribute can be a location of the respective vector object in the image. The first vector object can have a location in an output attribute space defined by the one or more attributes. The location can be defined by the current output attribute values for the first vector object. New values for the first output attribute for the first vector object can be calculated based on an attractive force on the first vector object towards a location in the output attribute space defined by the base value, or a repulsive force on the first vector object away from the location in the output attribute space defined by the base value. The base value of the first output attribute for first vector object can represent an anchor location for the first vector object in the output attribute space.

The first vector object and the second vector object can have locations in an output attribute space defined by the one or more attributes. The locations can be defined by the current output attribute values for the respective vector objects. New values for the first output attribute for the first vector object can be calculated based on an attractive or repulsive force between the first vector object and the second vector object in the output attribute space. The one or more attributes can include a spacing attribute defining a radius of the respective vector object in one or more dimensions of the output attribute space. New values for the first output attribute for the first vector object can be calculated based at least in part on one or more values of the spacing attribute for one or more of the first and second vector objects. The attractive or repulsive force can be calculated as a function of one or more values of the spacing attribute. New values for the first output attribute for the first vector object can be calculated based on an equilibrium of forces on the first vector object in the output attribute space. The forces between the first and second vector objects can have a magnitude that is proportional to a distance between the locations of the first and second vector objects in the input attribute space. The forces between the first and second vector objects can have a direction along a line between the locations of the first and second vector objects in the output attribute space. The attractive or repulsive force on the first vector object towards or away from the location in the output attribute space defined by the base value can have a magnitude that is proportional to a distance in the input attribute space between the location of the first vector object in the input attribute space and the location in the input attribute space defined by the base value or proportional to a value for an attraction attribute defined for the first vector object.

The one or more attributes can be selected from the group consisting of location in the image, color of the object, size of the object, orientation of the object, spacing of the object, transparency of the object, scale of the object and shape of the object. Particular implementations can also include displaying a representation of the image, the first vector object being displayed with visual characteristics defined at least in part by the calculated new values for the first output attribute.

In general, in another aspect, the invention features computer-implemented methods and apparatus, including computer program apparatus, implementing techniques for processing a plurality of related vector objects representing graphical elements in an image. The techniques include providing an image including a plurality of vector objects that include a first vector object and a plurality of second vector objects. Each of the first and second vector objects can have one or more current values for one or more attributes which define one or more visual characteristics of the respective vector objects. Each of the first and second vector objects can have a first output attribute of the one or more attributes. An input specifies one or more new values for an input attribute of the one or more attributes for the first vector object. In response to the input, new values for a first output attribute for each of the plurality of the second vector objects are calculated based at least in part on the base value of the first output attribute for the respective second vector object and the specified new input attribute values for the first vector object.

Particular implementations can include one or more of the following features. New attribute values can be calculated for a first output attribute based at least in part on the base value of the first output attribute for the respective first and second vector object and the specified new input attribute values for the first vector object.

In general, in another aspect, the invention features computer-implemented methods and apparatus, including computer program apparatus, implementing techniques for displaying a set of related vector objects representing a plurality of graphical elements in an image. The related vector objects have one or more current values for one or more attributes which define one or more visual characteristics of the related vector objects. The values for one or more of the attributes for each of the related vector objects are determined as a function of values for two or more of the other vector objects in the set of related vector objects. The techniques include defining a set of related vector objects, and displaying the vector objects in the set of related vector objects with visual characteristics defined by the attribute values.

Advantages that can be seen in implementations of the invention include one or more of the following. Defining relationships between attribute values of a related set of vector objects in an image allows a user to quickly change the appearance of a vector object, or a group of one or more vector objects. Attribute values of existing vector objects in an image can be automatically adjusted when a new vector object is added to the image. Changing an attribute value for one vector object can result in changes in attribute values for related vector objects without requiring the user to select each vector object and enter a new attribute value. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
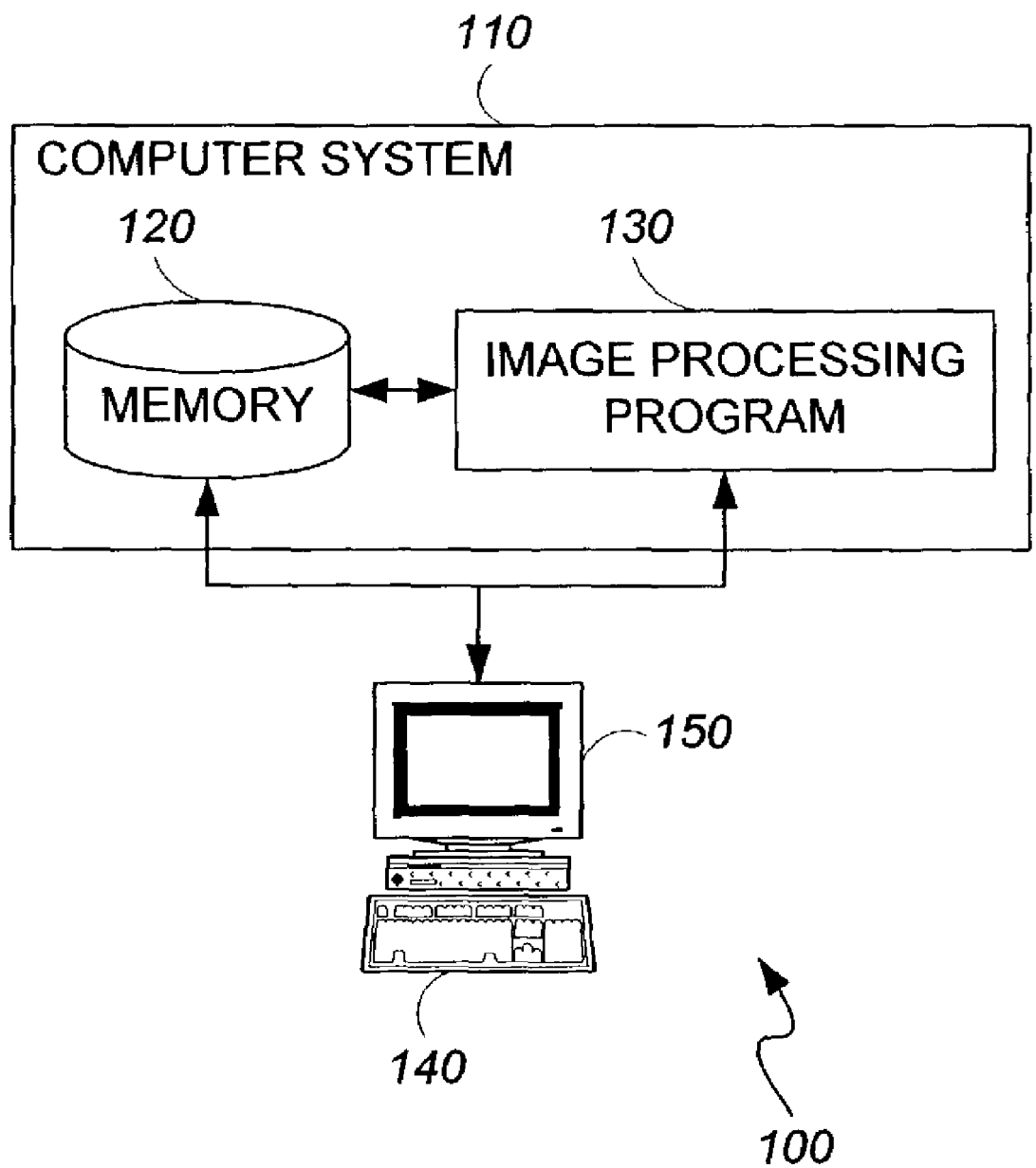
FIG. 1 is a block diagram depicting a graphical illustration system suitable for use in implementations of the present invention.

FIG. 1 illustrates a graphics illustration system 100 that includes a general-purpose programmable digital computer system 110 of conventional construction, including a memory 120 and a processor for running an illustration program 130, which can be implemented, for example, in a conventional vector illustration program such as Adobe® Illustrator®, available from Adobe Systems Incorporated of San Jose, Calif. Graphics illustration system 100 also includes input devices 140, such as a keyboard, mouse or digitizing pen, and output devices such as a display monitor 150. Optionally, graphics illustration system 100 also includes conventional communications hardware and software by which computer system 110 can be connected to other computer systems, such as over a network.

Figure 2A:
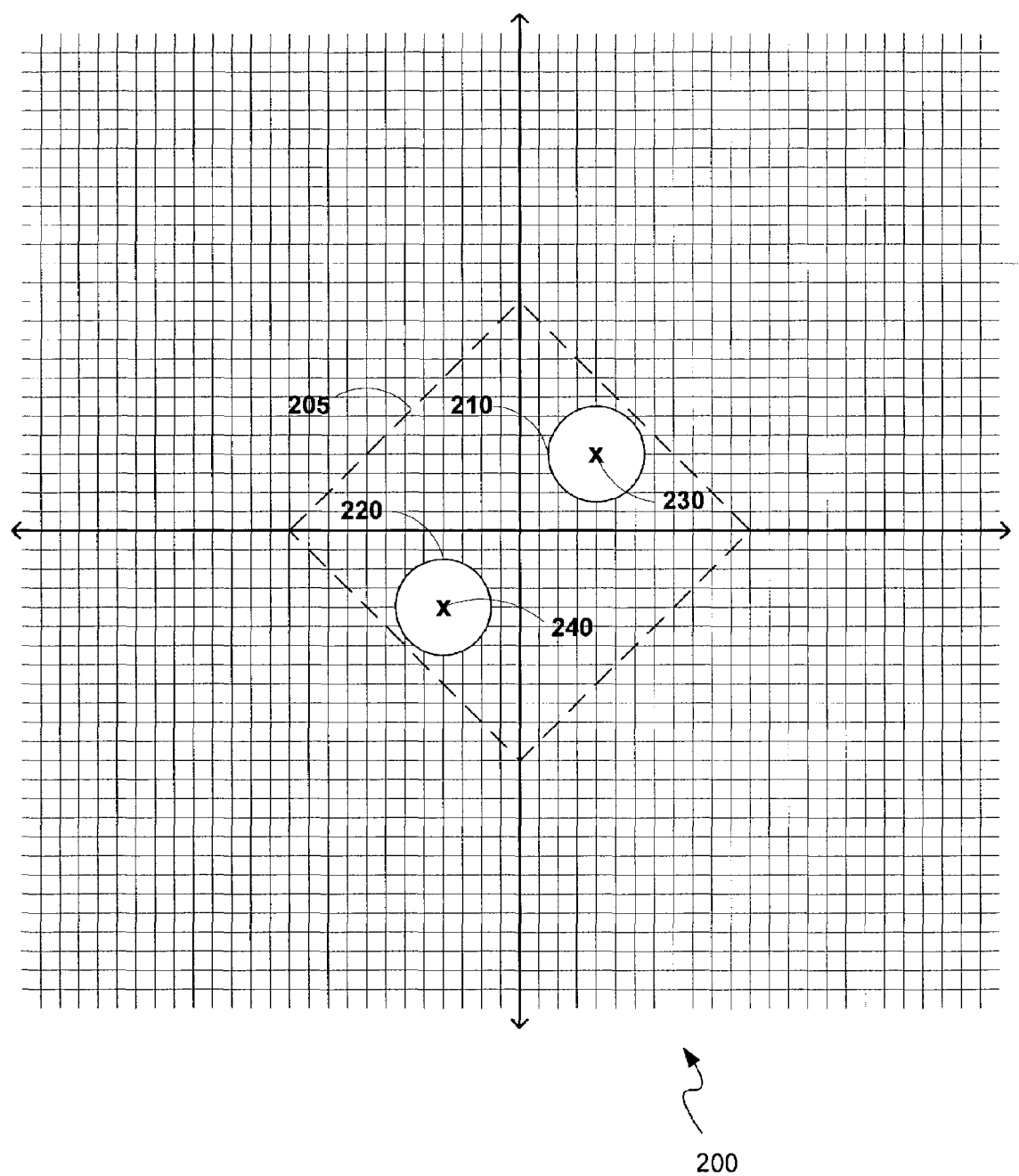
FIGS. 2A-2B illustrate an image including a set of vector objects in a related set having interdependent attributes.

FIG. 2A illustrates an image 200 generated in an illustration program 130 running on computer system 110. Image 200 includes a set 205 of vector objects 210 and 220 representing graphical elements in the image. The set of vector objects can be generated in illustration program 130 with a vector-based painting tool as described in contemporaneously filed U.S. patent application Ser. No. 10/177,925—"Modifying Vector Objects" by Lubomir Bourdev and Martin Newell, which is incorporated by reference in its entirety.

As discussed above, the graphical elements represented by vector objects 210 and 220 can be, for example, shapes, objects or other visual components of image 200, and can themselves include other images, including raster images. Vector objects 210 and 220 have one or more associated attributes defining visual characteristics in the image such as location, color, size, orientation, spacing, transparency, scale, shape and the like (i.e., any other attribute having a parameterized value defined in one or more attribute spaces that can have an effect on the visual appearance of the graphical element that the vector object represents. Attribute values for a vector object's attributes define the visual appearance of the corresponding graphical element when displayed, e.g., on monitor or printer 150. In the following discussion, the terms "graphical element" and "vector object" will be used interchangeably to refer to both the visual element in the image and the vector object that programmatically represents that element in illustration program 130.

Thus, for example, a vector object's location in an image may be defined by a pair of attribute values for a location attribute, representing x and y coordinates in the image; similarly, a vector object's color can be defined by one or more color values representing a color—for example, a single color value representing a shade of gray, a set of three color values representing RGB color values or the like. More generally, one or more attributes in a set of attributes can be considered to define an attribute space, with each attribute defining one or more axes in the attribute space. Each vector object for which the relevant attributes are defined can then be considered to occupy a location in the attribute space defined by its attribute values for the relevant attributes.

A vector object's initial attribute values can be assigned based on user input, or can be derived from pre-determined or default values, and can be fixed (i.e., not subject to alteration based on subsequent user input or operations in illustration program 130) or variable (changeable based on user input or drawing operations). A vector object's visual appearance is defined by a set of current attribute values (e.g., at the time the vector object is to be displayed).

The visual appearance of a vector object can be made to depend on the visual appearance of one or more other vector objects by defining relationships between the vector objects. Thus, vector objects 210 and 220 form a related set of objects, in that for at least one common attribute, the current value or values of the attribute for object 210 is determined at least in part as a function of an attribute value or values (for the same or a different attribute) for object 220, while the current value or values of the attribute for object 220 is determined at least in part as a function of an attribute value or values (again, for the same or a different attribute) for object 210.

The relationship between the vector objects can be defined using equations that define a value (or values) for an attribute for one vector object or elements as a function of other attribute value(s) defined for the same or different vector objects in the image. For example, functions analogous to equations of force can be applied to define attribute values for vector objects based on locations of the vector objects in some dimension or dimensions of attribute space. Thus, depending on the functions chosen, vector objects can be attracted towards the location of other vector objects in attribute space (i.e., their current values for one or more attributes can tend to be drawn towards the current values of neighboring vector objects) or vector objects can be repulsed from other vector objects in that space (i.e., their current attribute values can tend to be driven away from the current values of neighboring vector objects). Similarly, vector objects can be held in place in the attribute space (e.g., analogous to friction), or can be repulsed from a current location (or some other reference location) in attribute space. The relationships can also be more complex—for example, based on functions that combine an attractive force and a repulsive force, such as a force that is initially repulsive (or attractive) at a first distance between the objects, but that becomes attractive (or repulsive) at some specified second distance between the objects.

The interrelationships between vector objects can extend to different attributes of the vector objects, such that vector objects can be attracted towards, or repulsed away from, the locations of other vector objects in a first dimension or dimensions in attribute space based on the location of the other vector objects in the first and/or a second dimension or dimensions in attribute space. Thus, for example, a new color or size for a first vector object can be based on the proximity of other vector objects in location space, so that other vector objects near to the first vector object in location space may have more of an effect on the first vector object's color or size than those that are farther away. The image (e.g., image 200) can also include additional vector objects that are not included in the set of related vector objects, and that do not influence the attribute values of vector objects in the related set.

Figure 2B:
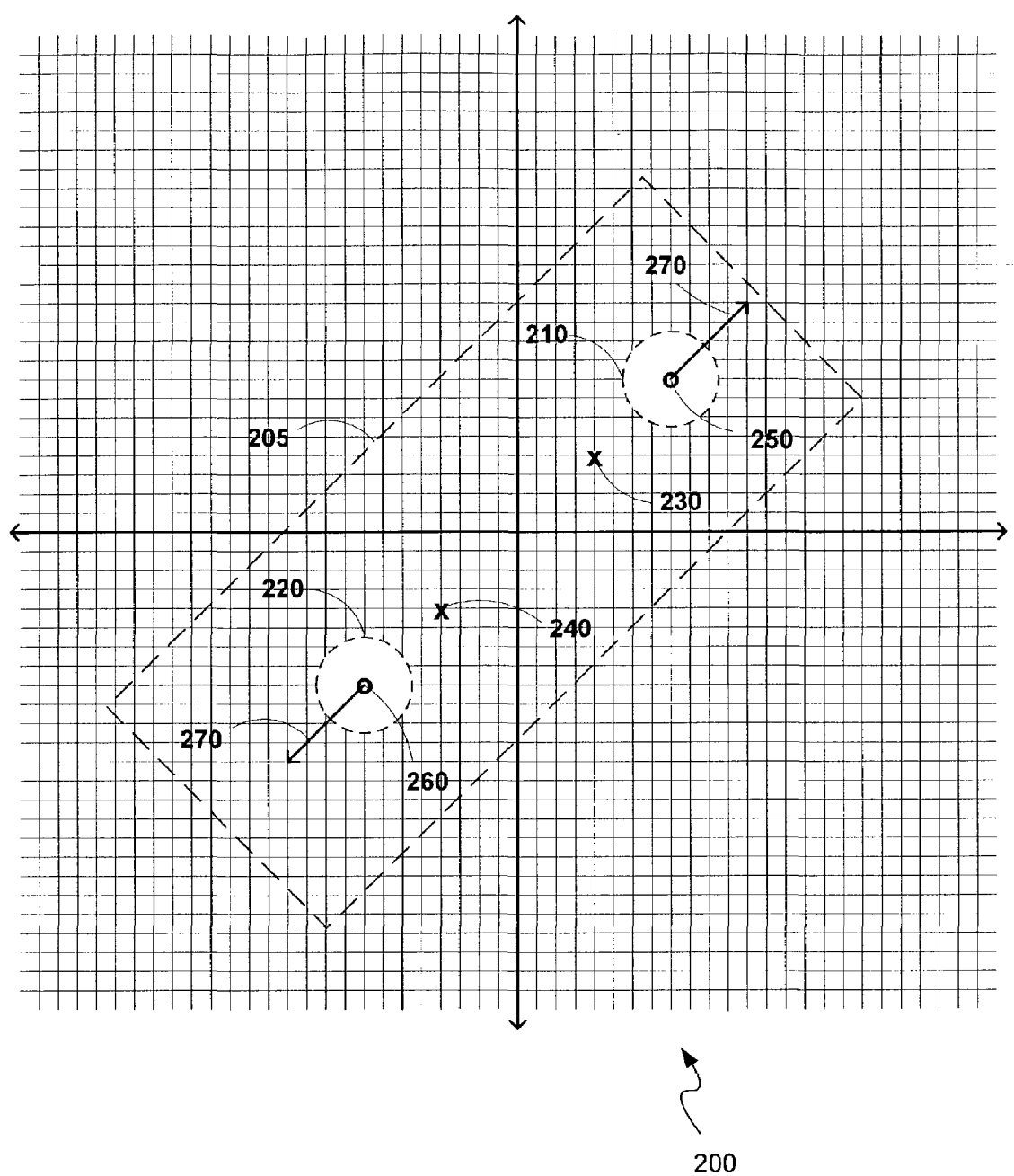
Figure 3:
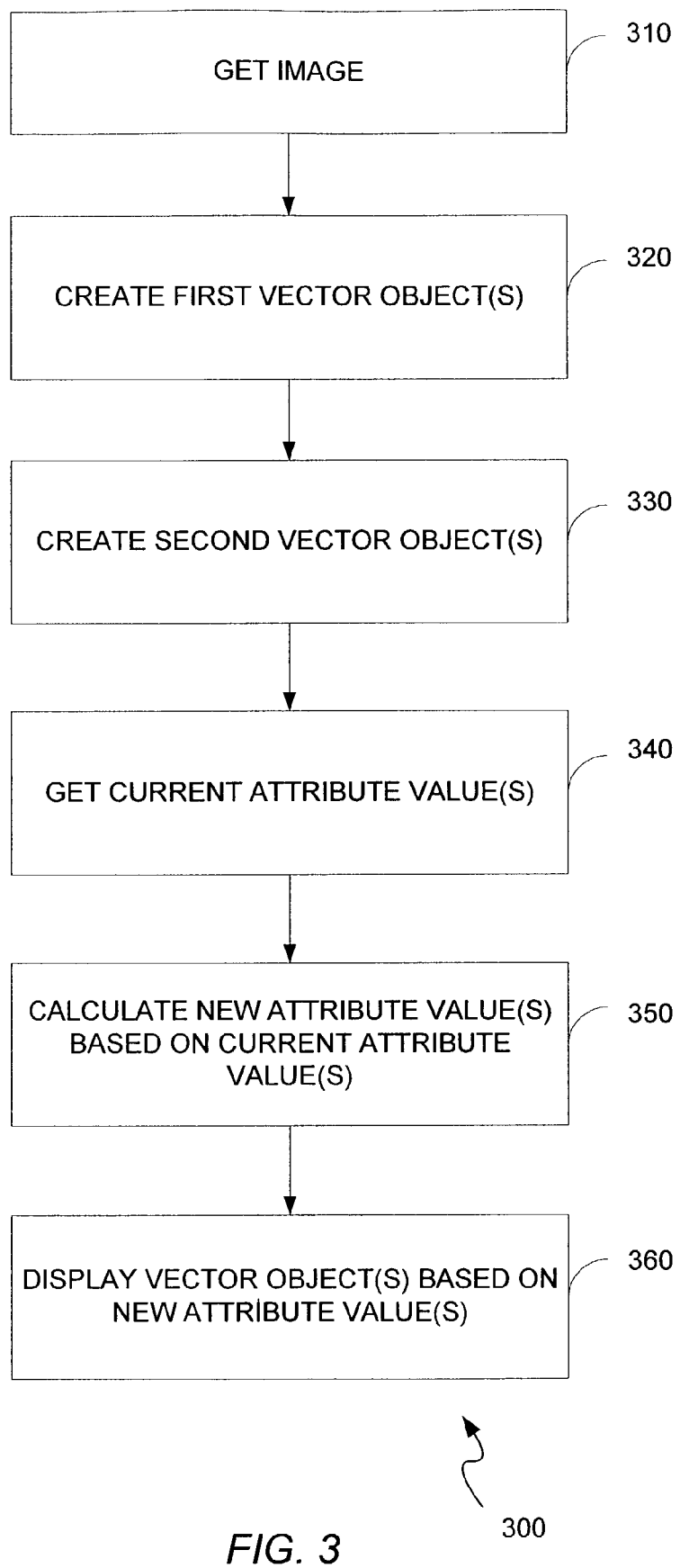
FIG. 3 is a flow diagram illustrating a method for calculating attribute values for vector objects as a function of attribute values of other vector objects in an image.

FIG. 3 illustrates a method 300 for calculating current attribute values for one or more related vector objects in an image. The method 300 begins by providing an image in illustration program 130 (step 310). Illustration program 130 creates a first vector object in the image (step 320). As used in this specification, illustration program 130 "creates" a vector object in the image by generating the vector object, retrieving the vector object from memory, or otherwise adding the vector object to the image in response to input from a user. For example, illustration program 130 can be configured to provide a drawing or painting tool for creating vector objects, and the first vector object can be created in response to user input employing such a tool. The first vector object has one or more current values for one or more attributes, such that the current attribute values define visual characteristics of the first vector object. For example, referring to the image illustrated in FIG. 2, illustration program 130 can create a vector object 210 having a current value for a location attribute representing the location 230 of vector object 210 in image 200.

Illustration program 130 subsequently creates a second vector object in the image (step 330). Like the first vector object, the second vector object has current values for one or more of the attributes for which current values are defined for the first vector object. Thus, referring again to FIG. 2A, illustration program 130 can create a second vector object 220, having location attribute values representing location 240 in image 200. In response to the creation of the second vector object in the image, illustration program 130 calculates one or more new attribute values for the first vector object based the current values (step 340). New attribute values can similarly be calculated for the second vector object based on the current values. For example, referring to FIG. 2B, illustration program 130 can calculate new location attribute values for the first and second vector objects, corresponding to new locations 250 and 260, using, for example, mathematical relationships defining a repulsive force 270 on each of the vector objects as will be described in more detail below. The image can then be displayed, with the vector objects being displayed according to the new attribute values (step 350). When additional vector objects are subsequently created in the image, illustration program 130 can be configured to treat the new vector objects similarly, calculating new attribute values for some or all of the vector objects based at least in part on the current attribute values for the new vector objects. Alternatively, new vector objects can be added to the image that are not related to the first and second vector objects described above, in which case their creation does not result in a calculation of new attribute values for the first and second vector objects by illustration program 130.

Illustration program 130 can also be configured to calculate new attribute values based on reference values defined for the vector objects or for the image in general. Thus, for example, a new attribute value or values can be calculated for a vector object based in part on the proximity of the vector object in attribute space to a reference value (i.e., a reference location in the attribute space). Reference values can include base values defined for one or more of the attributes for the vector objects, representing reference or anchor locations for the respective vector objects in a dimension or dimensions of attribute space. A vector object's base value can be, for example, an initial value assigned when the vector object was created in the image. Alternatively, a base value can be set as desired—for example, based on user input at any time during image processing. Reference values can also include one or more external reference values defined for the image. For example, a reference value can include a reference location value or values representing one or more locations in the image, such as a point, line or shape in the image. A vector object's attribute values can also include one or more spacing values representing the vector object's radius in a dimension or dimensions of attribute space. These values can be used to determine current attribute values for a vector object or vector objects as will be described below.

Figure 4:
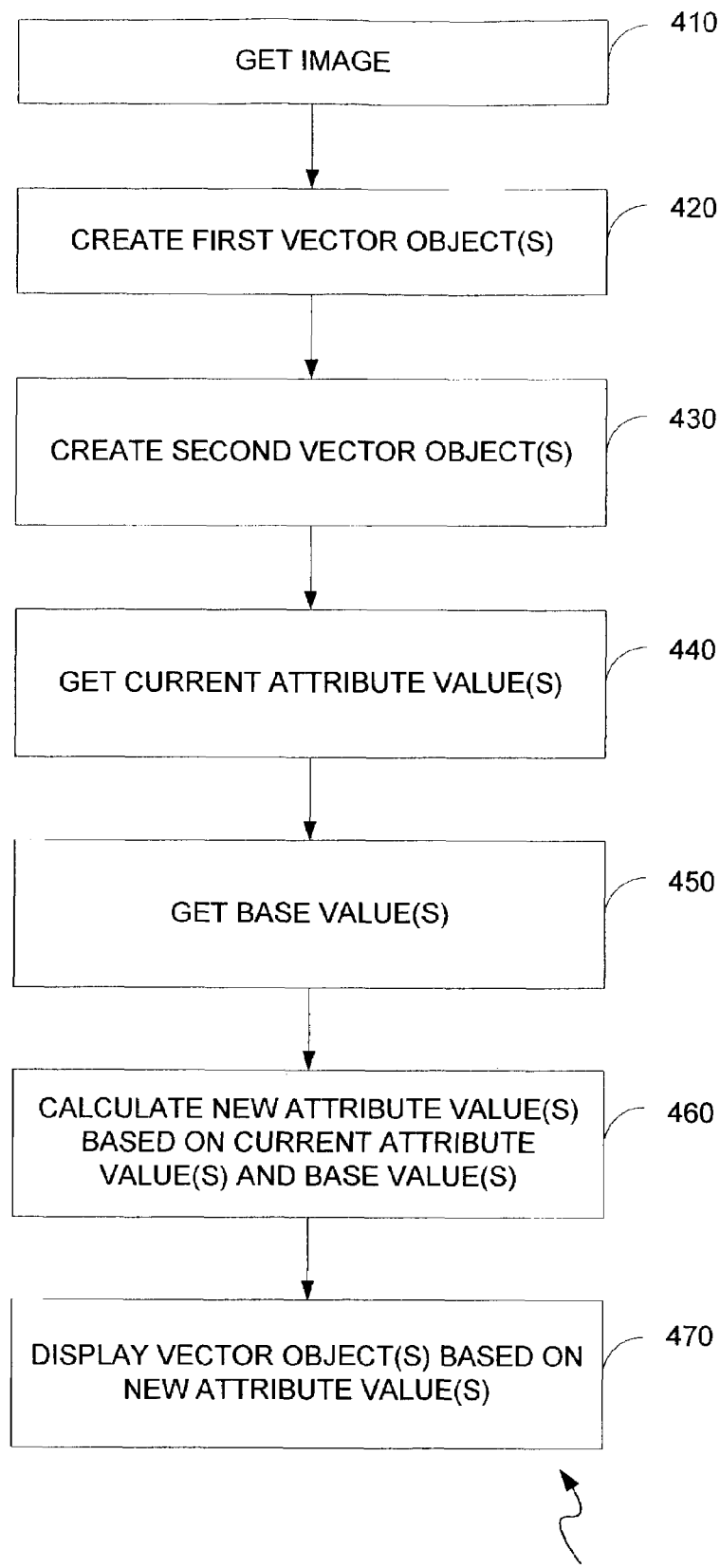
FIG. 4 is a flow diagram illustrating an alternative method for calculating attribute values for vector objects as a function of attribute values of other vector objects in an image.
Figure 5A:
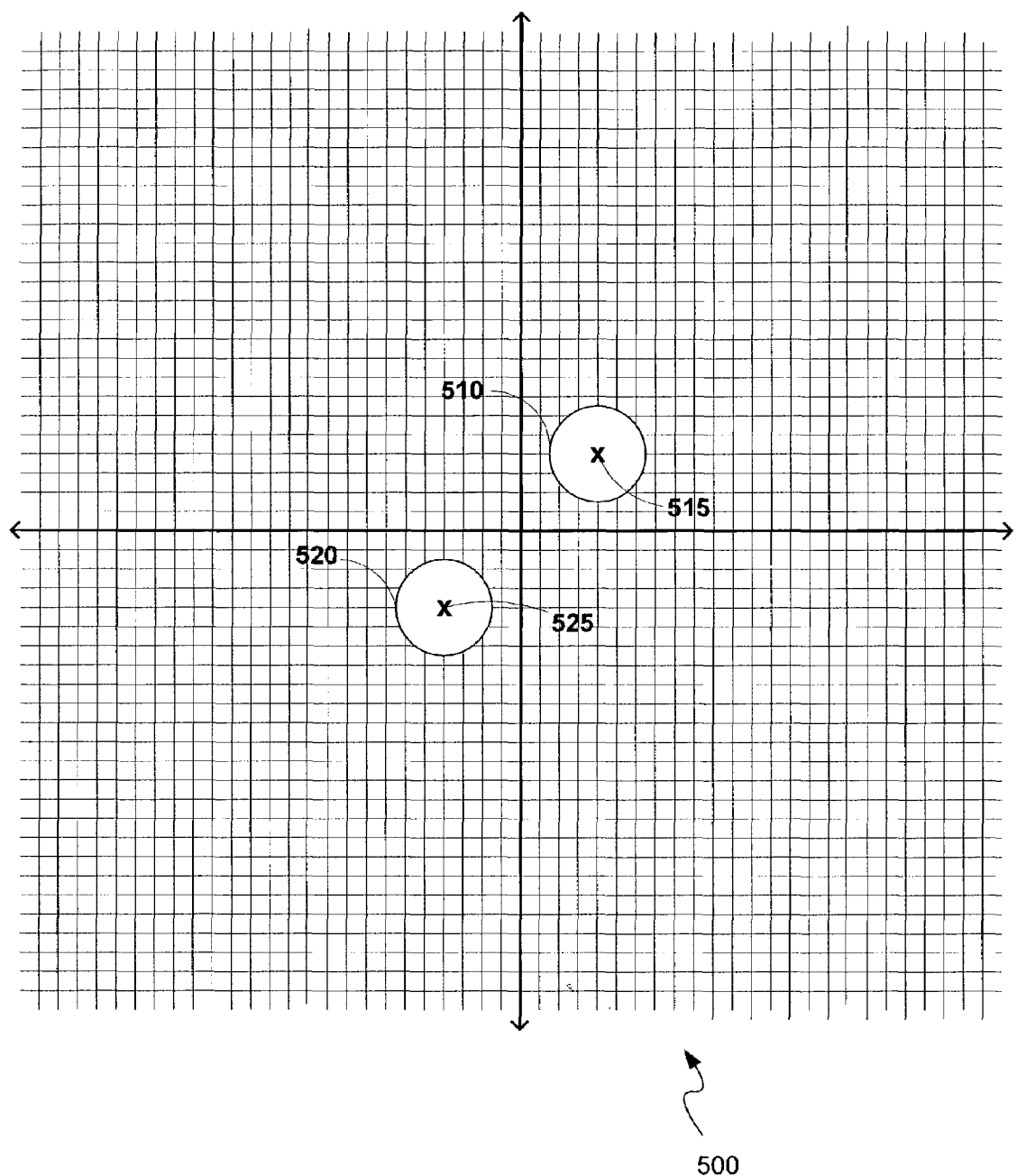
FIGS. 5A-5C illustrate an image including multiple vector objects in a related set having interdependent attributes.
Figure 5B:
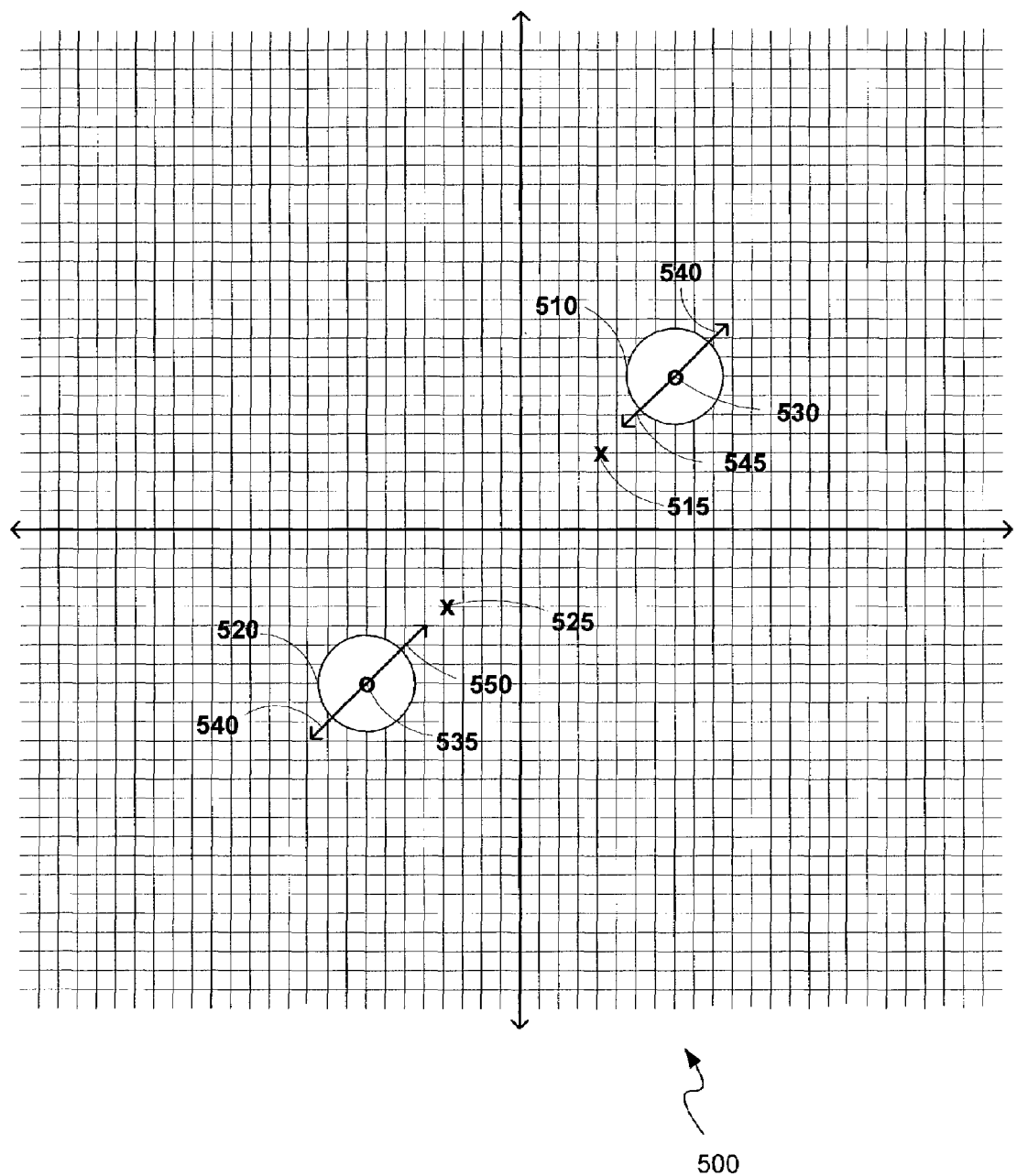
Figure 5C:
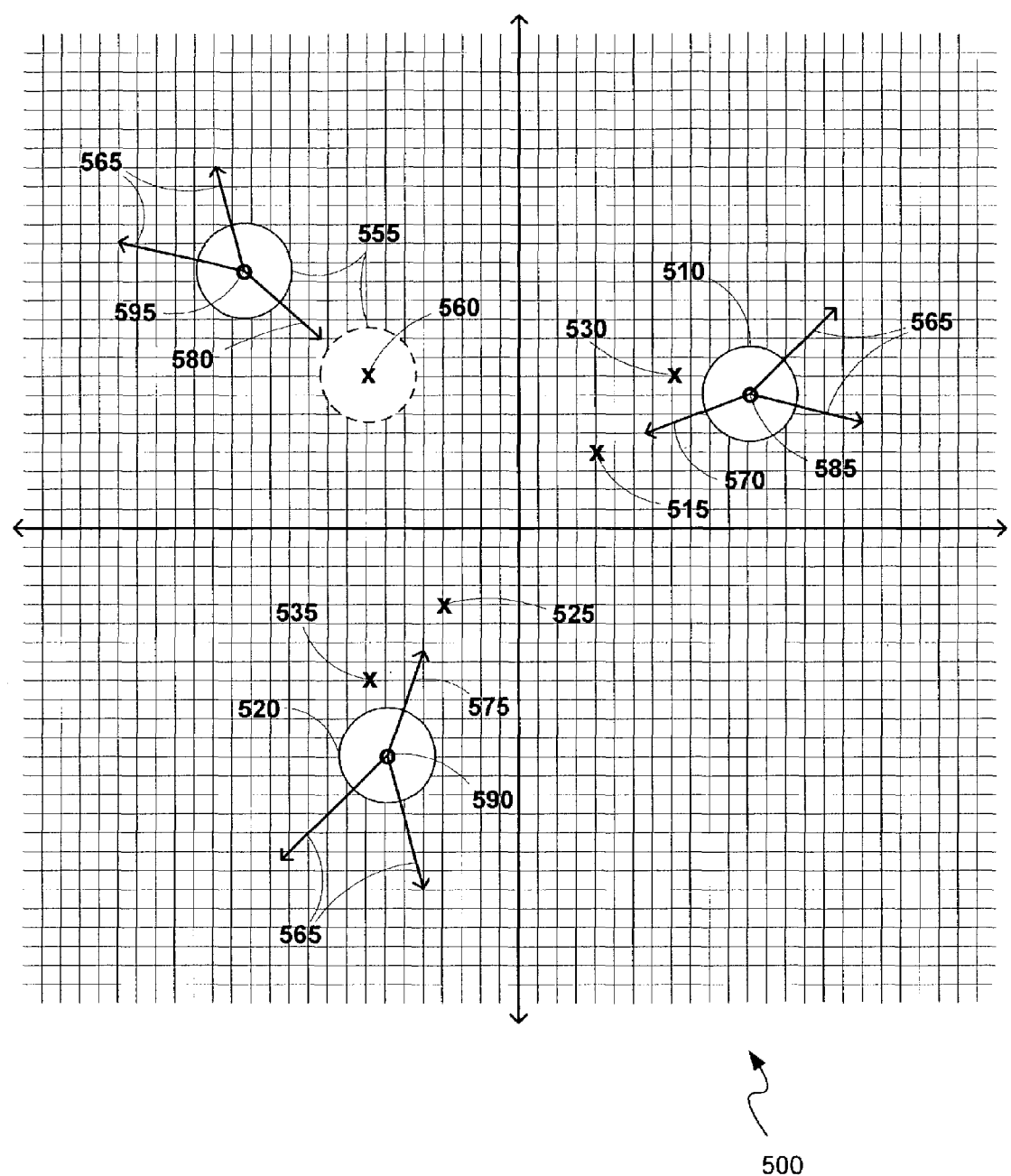

FIG. 4 illustrates a method 400 for calculating attribute values based on current attribute values and base values for related vector objects in an image. The method 400 begins by providing an image in illustration program 130 (step 410). Illustration program 130 creates a first vector object or objects in the image, such as vector object 510, created at location 515 in an image 500 illustrated in FIG. 5A, as described above (step 420). In addition to current attribute values as described above, the first vector object can have base values defined for one or more attributes. Referring again to FIG. 5A, the base value of a vector object can represent, for example, an anchor location corresponding to initial location 515 at which vector objects 510 is created in the image. Illustration program 130 subsequently creates a second vector object or objects in the image (step 430)—such as vector object 520 created at location 525 in image 500. The second vector object can also have current attribute values and base values for one or more attributes. In response to the creation of the second vector object in the image, illustration program 130 calculates one or more new attribute values for the first vector object or objects based in part on the current values for the second object or objects and the base values for the first object or objects (step 440). Referring to the example of FIG. 5B, illustration program 130 can calculate new location attribute values for the first and second vector objects, corresponding to new locations 530 and 535, using, for example, mathematical relationships defining a repulsive force 540 between each pair of vector objects and attractive forces 545 and 550 towards each vector object's base location as will be described in more detail below. The image can then be displayed, with the vector objects being displayed according to the new attribute values (step 450). As discussed above, additional vector objects can be subsequently added to the image, and can be treated as related vector objects, in which case their addition to the image can result in changes to current attribute values for the first and second vector objects, or as unrelated vector objects, in which case they will have no such affect FIG. 5C illustrates how vector objects 510 and 520 are affected when a third vector object 555 is added to image 500 at location 560. In the example of FIG. 5C, in response to the creation of vector object 555 in image 500, illustration program 130 calculates new location values for each vector object by solving a set of equations defining a repulsive force 565 on each of the vector objects (which can be calculated for a given vector object, e.g., as the sum of repulsive forces between the vector object in question and each of the other related vector objects in the image) and an attractive force 570 on vector object 510 towards its anchor location 515, a force 575 on vector object 520 towards its anchor location 525, and an attractive force 580 on vector object 555 towards its anchor location 560. In this example, the new location values for each vector object are calculated by finding the equilibrium between the attractive and repulsive forces on each vector object. The vector objects are then displayed at new locations 585, 590 and 595, respectively, in the image 500. In some implementations, the equations defining the relationships between vector objects (e.g., the repulsive and attractive forces discussed above) can be analogous to the well-known equations defining interactions between physical particles—for example, the repulsive force between particles bearing like electric charges, the attractive force due to gravity, the strong force, the weak force or the like. However, any function defining relationships between two or more vector objects could be used as long as the system of equations converges.

The value of an attribute, referred to herein as the output attribute, can be defined as a function of an attribute that will be referred to herein as the input attribute. The input and output attributes can be the same or different. In general, all the forces discussed below are in dimensions of an output attribute space but their magnitudes are based on distances in an input attribute space as described in greater detail below. In a preferred implementation, the functions include an equation defining an attractive force, whose magnitude is proportional (which, as used in this specification, can also include inversely proportional) to the distance between the current value and the base value of the input attribute and to the radius of the vector object (defined, e.g., by its spacing value as described above) and whose direction is along the line defined by the current value and base value of the output attribute, according to the formula:

$$AF_i = -p * R_i * NA_i * SA_i$$

where $AF_i$ is the attractive force on the current value of an output attribute for a vector object i towards the base value of the output attribute for the vector, p is a proportionality factor that controls the strength of the attraction towards the base value of the output attribute for each vector object i which can be defined in illustration program 130 or based on optional input from a user, $R_i$ is the radius of vector object i, $NA_i$ is the normalized vector along the line defined by the vector object's current value of the output attribute and its base value of the output attribute, defined by the formula:

$$NA_i = \frac{(CV\_O_i - BV\_O_i)}{|CV\_O_i - BV\_O_i|}$$

where $CV\_O_i$ is the current value of the output attribute of vector object i and $BV\_O_i$ is the base value of the output attribute of vector object i, and $SA_i$ is a scalar proportional to the distance between the vector object's current value and base value of the input attribute, defined for example by the formula:

$$SA_i = |CV\_I_i - BV\_I_i|^{XA}$$

where $CV\_I_i$ is the current value for the input attribute of vector object i and $BV\_I_i$ is the base value of the input attribute of vector object i, and XA is a proportionality factor that may be defined in illustration program 130 or based on optional input from a user.

Similarly, the functions also include an equation defining a repulsive force (whose magnitude is proportional to the distance between the current value and the base value of the input attribute) between the current value of the output attribute of a vector object and the current values of the output attributes of one or more other vector objects. In this implementation, the repulsive force between two vector objects is proportional to their respective radii and is directed along the line defined by the current value and the base value of the output attribute. This repulsive force on attribute values of vector objects i and j can be defined by the formula:

$$RF_{i,j} = NR_{i,j} * SR_{i,j} * R_i * R_j,$$

where $RF_{i,j}$ is the repulsive force between the current values of an output attribute of vector objects i and j, $NR_{i,j}$ is the normalized vector along the line defined by the two vector objects' current output attribute values, defined by the formula:

$$NR_{i,j} = \frac{(CV\_O_i - CV\_O_j)}{|CV\_O_i - CV\_O_j|}$$

and $SR_{i,j}$ is a scalar proportional to the distance between the two vector objects's current input attribute values i and j, defined, for example, by the formula:

$$SR_{i,j} = |CV\_I_i - CV\_I_j|^{-XR}$$

where XR is a proportionality factor that may be defined in illustration program 130 or based on optional input from a user.

The cumulative repulsive force between the current values of an output attribute of vector object i and the other vector objects in the image is thus defined by:

$$RF_L = \sum_{J=[1,n], j \neq i} RF_{i,j}$$

where $RF_i$ is the cumulative repulsive force between the current values of an output attribute of vector object i and other vector objects in the image.

In one implementation, the current value for an output attribute is defined as the output attribute space location for which all forces on the vector object are in equilibrium given by:

$$RF_i + AF_i + GF_i = 0$$

where $GF_i$ is a force which can be defined in illustration program 130 or based on optional input from a user. For example, $GF_i$ can be a constant-value force, or a force defined by a function—e.g., a force that is inversely proportional to the distance of the vector object's location from a given outline, such the vector object will stay inside (or outside) of a given shape.

The three forces ($RF_i$, $AF_i$, and $GF_i$) are functions on the current value for the output attribute of vector object i, $CV\_O_i$:

$$RF_i(CV\_O_i) + AF_i(CV\_O_i) + GF_i(CV\_O_i) = 0 \qquad \text{eq. 1}$$

In general, the equation above is of high degree and has no simple closed-form solution for $CV\_O_i$.

In a preferred implementation (when there is no closed-form solution for $CV\_O_i$), the solutions for new values of an attribute for the n vector objects in the output attribute space can be solved by approximating the equations with an iterative method. The iterative method begins with the sum of the forces not at equilibrium, given by:

$$RF_i(CV\_O_i) + AF_i(CV\_O_i) + GF_i(CV\_O_i) = K \qquad \text{eq. 2}$$

The equilibrium is in the direction of K, and the magnitude of K is proportional to how far the forces acting on vector object i are from equilibrium. The value of $CV\_O_i$ is then moved along the vector K as follows:

$$CV\_O_i = CV\_O_i + K*\text{Step} \qquad \text{eq. 3}$$

where Step is a parameter that affects the speed of convergence. Equations (2) and (3) are repeated while decreasing the Step parameter, and $CV\_O_i$ is approximated until $CV\_O_i$ is sufficiently close to the equilibrium of the three forces. Alternatively, one or more of the functions in equation (1) above can be computed once at the initial value of $CV\_O_i$, along with their first (and possibly higher degree) derivatives, and can be approximated for subsequent values of $CV\_O_i$ (e.g., using a Taylor expansion). The current value $CV\_O_i$ for the attribute of vector object i in the output attribute space should to be approximated for all n particles simultaneously, not one by one. In some implementations, there is a closed-form solution to equation (1) above. In particular if the output and input attributes are the same (i.e., $CV\_O_i = CV\_I_i$ and $BV\_O_i = BV\_I_i$), the attractive force has a linear proportionality (XA=1), and there is no other force (i.e., $GF_i=0$), then the sum of the forces becomes:

$$RF_i + AF_i = 0$$

$$AF_i = (-p)(CV_i - BV_i) * R_i$$

$$RF_i + (-p)(CV_i - BV_i) * R_i = 0$$

$$CV_i = BV_i - \frac{\sum_{j=[1,n], j \neq i} \frac{(CV_i - CV_j)}{|CV_i - CV_j|^{(1+XR)}} * R_j}{(-p)} = BV_i - \frac{RF_i}{R_i * (-p)}$$

where $CV_i$ represents $CV\_O_i$ (or $CV\_I_i$) and is the current value for the output attribute of object i.

Preferably, the solutions for new values of an output attribute for the n objects, in implementation where there is a closed-form solution to equation (1) above can be solved by approximating the equations with a series of small steps. For an infinitely small step, the cumulative repulsive force on the current value of an output attribute of a vector object $RF_i$, is a constant. The new value for the output attribute can be approximated as follows:

$$RF_{ik} = R_i * \sum_{j=[1,n], j \neq i} \frac{(CV_{ik} - CV_{jk})}{|CV_{ik} - CV_{jk}|^{(1+XR)}} \approx RF_{ik+1}$$

$$CV_{ik+1} = BV_i - \frac{RF_{ik+1}}{(-p)*R_i} \approx BV_i - \frac{RF_{ik}}{(-p)*R_1}$$

where k is the current iteration step (and $CV_{ik+1}$ approximates the new attribute value). Alternatively, the cumulative repulsive force on the current value of an attribute of a vector object can be approximated as a linear function by using the first derivative of $RF_i$.

In one implementation, after m iterations, the approximation $CV_{im}$ will be sufficiently close to the correct value. The average-case time complexity of the relaxation process is equal to its worst case, $O(m*n^2)$. Preferably, the cumulative repulsive force between the current values of an attribute of vector object i and the other vector objects in the image, for each vector object i, can be maintained and updated only when a vector object's location in the attribute space changes by more than a given threshold, $\Delta$. To do so, illustration program 130, in a first step, computes an initial cumulative repulsive force per vector object, defined by:

$$RF_{i0} = R_i * \sum_{j=[1,n], j \neq i} \frac{(CV_i - CV_j) * R_i}{|CV_i - CV_j|^{(1+XR)}}$$

where $RF_{i0}$ is the vector representing the initial cumulative repulsive force between the current values of an attribute of vector object i and the other vector objects in the image i. Next, in a second step, the current value of the attribute for each vector object i is updated according to the following:

$$CV_{ik+1} = BV_i - \frac{RF_{ik}}{(-p)*R_i}.$$

Illustration program 130 next determines whether the current value of the attribute for each vector object i has changed significantly—i.e., if $$|CV_{ik+1} - CV_{ik}| > \Delta.$$

If so, illustration program 130 updates the effect of the change of the current value of the attribute for each vector object i on the cumulative repulsive force of each other vector object j according to the following:

$$RF_j = RF_j + RF_{i,jk+1} - RF_{i,jk} =$$

$$RF_j + R_i * R_j \left( \frac{CV_{ik+1} - CV_{jk}}{|CV_{ik+1} - CV_{jk}|^{(1+XR)}} - \frac{CV_{ik} - CV_{jk}}{|CV_{ik} - CV_{jk}|^{(1+XR)}} \right).$$

Illustration program 130 then determines whether any of the current values of the attribute for all of the n vector objects in this iteration has changed significantly, a predetermined distance of tau—i.e. while $$\left( \max_{i \in [1,n]} |CV_{ik+1} - CV_{ik}| \right) > \tau,$$

then illustration program 130 returns to the second step above and performs another iteration, k=k+1. The approximated new attribute value for each vector object i is determined by the values $CV_{ik}$.

Figure 6:
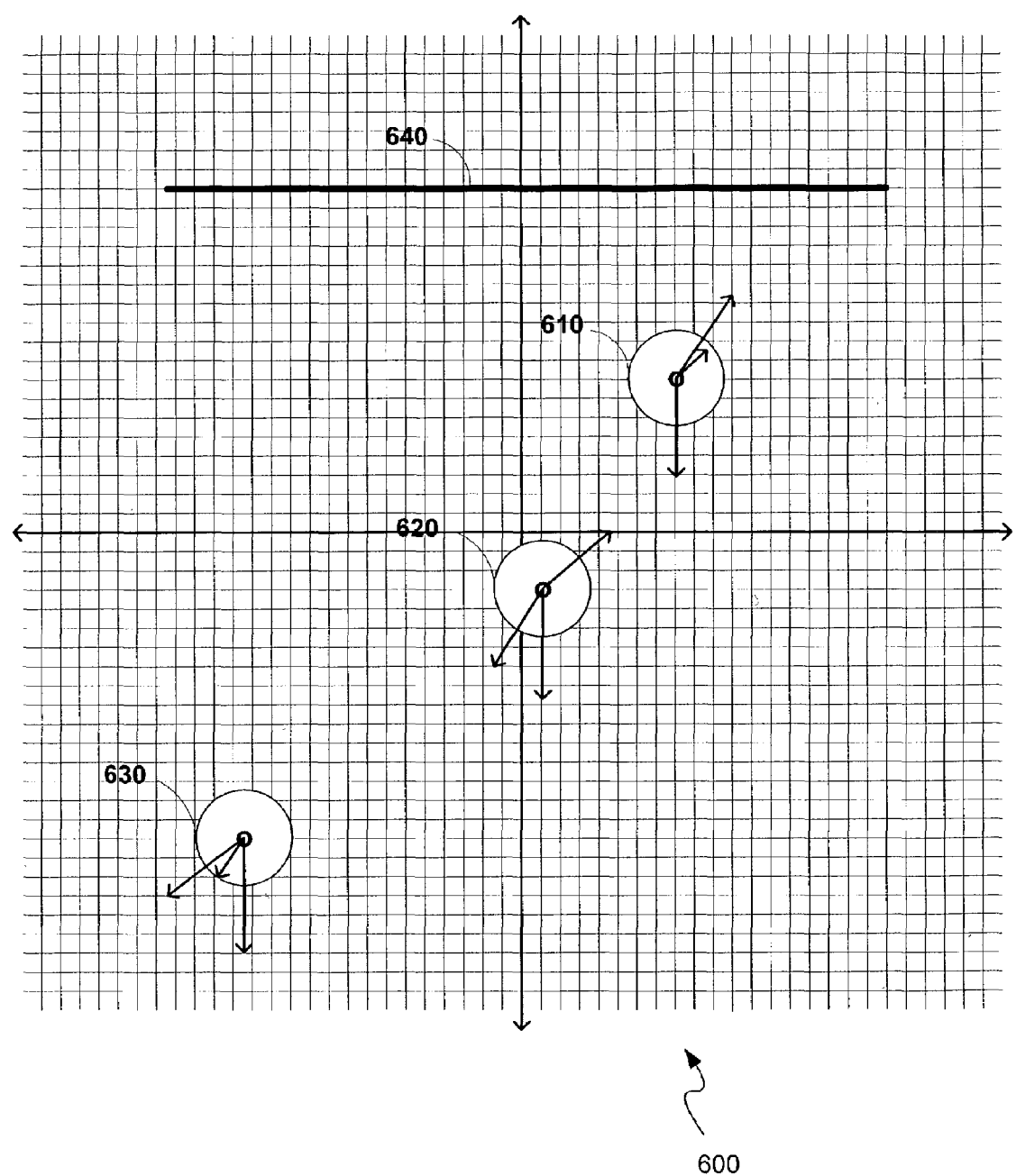
FIG. 6 illustrates an image, in another embodiment, including multiple vector objects in a related set having interdependent attributes.

As mentioned above, illustration program 130 can also be configured to calculate attribute values for related vector objects based in part on external reference values defined in the image. Referring to FIG. 6, vector objects 610, 620 and 630 can be created in an image 600. Image 600 also includes a set of reference location values, which, for example, can define a line 640 in the image. As vector objects 610, 620 and 630 are created in the image, illustration program 130 can be configured to calculate new attribute values for one or more of their attributes based on their proximity to line 640. Thus, for example, illustration program 130 (e.g., a drawing or painting tool implemented in that program) can be configured such that the vector objects (i.e., the location attribute values) move towards or away from line 640 as they are created in the image, or such that the colors of the vector objects move towards or away from a reference color associated with line 640 (e.g., the closer a vector object is to rectangle 640, the "greener" its color values become).

Illustration program 130 can also be configured to calculate new attribute values for related vector objects existing in an image in response to a change in one or more attribute values of one or more of the related vector objects. Thus, for example, referring to the example of FIG. 2, illustration program 130 can be configured to present the user with an interface through which the user can specify a change in one or more attribute values for one or more of vector objects 210 and 220—for example, moving vector object 220 to a new location represented by a new location attribute value or values. In response to the specified attribute value change (which defines a new current attribute value for the specified vector object), illustration program 130 can then calculate new attribute values for one or more of the related vector objects based on the changed value (and optionally one or more reference values as described above)—in this example, calculating a new location attribute value or values for vector object 210 based on the repulsive force between vector object 210 at location 250 and vector object 220 at its new specified location in the image—e.g., via the $GF_i$ force in equation (1) above.

The invention can be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in specially-designed ASICs (application-specific integrated circuits).

A number of embodiments of the invention have been described. Nevertheless, it will be understood that various modifications may be made without departing from the spirit and scope of the invention. For example, the steps of the methods described herein need not be performed in the order described. Additionally, although particular implementations have been described in the context of specific equations defining the relationships between attributes, any desired equations defining relationships between two or more vector objects can be used, as discussed above—for example, the attributes (input or output) used in calculating attractive and/or repulsive forces can be the same or different. Accordingly, other embodiments are within the scope of the following claims.

What is claimed is:

1. A computer implemented method, comprising:
   accepting user input to create a new vector object and select a position for the new vector object in an image;
   in response to the accepting, adding the new vector object to a plurality of vector objects, each vector object in the plurality of vector objects having an associated position and appearance in the image, the associated position being dependent upon the position of one or more other vector objects in the plurality of vector objects; and
   changing the associated positions of a plurality of first vector objects in the plurality of vector objects based on the position of the new vector object and establishing equilibrium of forces acting between each of the associated positions of the plurality of first vector objects; and displaying the image.

2. The computer implemented method of claim 1, where:
   the position of a vector object is dependent on an initial position of the vector object.

3. The computer implemented method of claim 1, further comprising:
   changing the associated appearance of a plurality of second vector objects in the plurality of vector objects based on forces acting on the associated appearance of the plurality of second vector objects.

4. The computer implemented method of claim 1, where:
   the appearance of a vector object includes one or more of size, color, and transparency of the vector object in the image.

5. The computer implemented method of claim 1, where:
   a force is an attractive force or a repulsive force.

6. The computer implemented method of claim 1, where:
   the changing causes the positions of the plurality of first vector objects to maintain a calculated distance from each other.

7. A computer implemented method, comprising:
   accepting selection of a position for a new vector object in an image;
   in response to the accepting adding the new vector object to a plurality of vector objects, each vector object in the plurality of vector objects having an associated position and appearance in the image, the associated appearance being dependent upon the appearance of one or more other vector objects in the plurality of vector objects; and
   changing the associated appearances of a plurality of first vector objects in the plurality of vector objects based on the appearance the new vector object and establishing equilibrium of forces acting between each of the associated appearances of the plurality of first vector objects; and displaying the image.

8. The computer implemented method of claim 7, further comprising:
   changing the associated position of a plurality of first vector objects in the plurality of vector objects based on the position the new vector object and forces acting on the associated positions of the plurality of first vector objects.

9. The computer implemented method of claim 7, where:
the appearance of a vector object includes one or more of size, color, and transparency of the vector object in the image.

10. A computer program product, encoded on a computer-readable medium, operable to cause data processing apparatus to perform operations comprising:
accepting user input to create a new vector object and select a position for the new vector object in an image;
in response to the accepting, adding the new vector object to a plurality of vector objects, each vector object in the plurality of vector objects having an associated position and appearance in the image, the associated position being dependent upon the position of one or more other vector objects in the plurality of vector objects; and
changing the associated positions of a plurality of first vector objects in the plurality of vector objects based on the position of the new vector object and establishing equilibrium of forces acting between each of the associated positions of the plurality of first vector objects.

11. The computer program product of claim 10, where:
the position of a vector object is dependent on an initial position of the vector object.

12. The computer program product of claim 10, further operable to cause the data processing apparatus to perform operations comprising:
changing the associated appearance of a plurality of second vector objects in the plurality of vector objects based on forces acting on the associated appearance of the plurality of second vector objects.

13. The computer program product of claim 10, where:
the appearance of a vector object includes one or more of size, color, and transparency of the vector object in the image.

14. The computer program product of claim 10, where:
a force is an attractive force or a repulsive force.

15. The computer program product of claim 10, where:
the changing causes the positions of the plurality of first vector objects to maintain a calculated distance from each other.

16. A computer program product, encoded on a computer-readable medium, operable to cause data processing apparatus to perform operations comprising:
accepting selection of a position for a new vector object in an image;
in response to the accepting, adding the new vector object to a plurality of vector objects, each vector object in the plurality of vector objects having an associated position and appearance in the image, the associated appearance being dependent upon the appearance of one or more other vector objects in the plurality of vector objects; and
changing the associated appearances of a plurality of first vector objects in the plurality of vector objects based on the appearance the new vector object and establishing equilibrium of forces acting between each of the associated appearances of the plurality of first vector objects.

17. The computer program product of claim 16, where:
changing the associated position of a plurality of first vector objects in the plurality of vector objects based on the position the new vector object and forces acting on the associated positions of the plurality of first vector objects.

18. The computer program product of claim 16, where:
the appearance of a vector object includes one or more of size, color, and transparency of the vector object in the image.

19. A system comprising:
means for accepting user input to create a new vector object and select a position for the new vector object in an image;
in response to the accepting, means for adding the new vector object to a plurality of vector objects, each vector object in the plurality of vector objects having an associated position and appearance in the image, the associated position being dependent upon the position of one or more other vector objects in the plurality of vector objects; and
means for changing the associated positions of a plurality of first vector objects in the plurality of vector objects based on the position of the new vector object and establishing equilibrium of forces acting between each of the associated positions of the plurality of first vector objects.

20. The system of claim 19, where:
the position of a vector object is dependent on an initial position of the vector object.

21. The system of claim 19, further comprising:
means for changing the associated appearance of a plurality of second vector objects in the plurality of vector objects based on forces acting on the associated appearance of the plurality of second vector objects.

22. The system of claim 19, where:
the appearance of a vector object includes one or more of size, color, and transparency of the vector object in the image.

23. The system of claim 19, where:
a force is an attractive force or a repulsive force.

24. The system of claim 19, where:
the changing causes the positions of the plurality of first vector objects to maintain a calculated distance from each other.

25. A system comprising:
means for accepting selection of a position for a new vector object in an image;
in response to the accepting, means for adding the new vector object to a plurality of vector objects, each vector object in the plurality of vector objects having an associated position and appearance in the image, the associated appearance being dependent upon the appearance of one or more other vector objects in the plurality of vector objects; and
means for changing the associated appearances of a plurality of first vector objects in the plurality of vector objects based on the appearance the new vector object and establishing equilibrium of forces acting between each of the associated appearances of the plurality of first vector objects.

26. The system of claim 25, further comprising:
means for changing the associated position of a plurality of first vector objects in the plurality of vector objects based on the position the new vector object and forces acting on the associated positions of the plurality of first vector objects.

27. The system of claim 25, where:
the appearance of a vector object includes one or more of size, color, and transparency of the vector object in the image.

* * * * *